US010015288B2

(12) United States Patent
Okubo (10) Patent No.: US 10,015,288 B2
(45) Date of Patent: Jul. 3, 2018

(54) COMMUNICATION APPARATUS AND CONTROL METHOD OF COMMUNICATION APPARATUS (71) Applicant: CANON KABUSHIKI KAISHA, Tokyo (JP)

(72) Inventor: Yuzuru Okubo, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 30 days.

(21) Appl. No.: 14/789,277

(22) Filed: Jul. 1, 2015

(65) Prior Publication Data
US 2016/0014239 A1 Jan. 14, 2016

(30) Foreign Application Priority Data
Jul. 8, 2014 (JP) .................................. 2014-140867

(51) Int. Cl.
H04L 29/06 (2006.01)
H04L 12/801 (2013.01)
H04L 12/807 (2013.01)

(52) U.S. Cl.
CPC ............. *H04L 69/16* (2013.01); *H04L 47/18* (2013.01); *H04L 47/193* (2013.01); *H04L 47/27* (2013.01)

(58) Field of Classification Search
CPC ....... H04L 69/16; H04L 47/18; H04L 47/193; H04L 47/27
USPC ......................................................... 370/231
See application file for complete search history.

(56) References Cited

U.S. PATENT DOCUMENTS

| 6,611,495 B1* | 8/2003 | Meyer | H04L 1/1809 370/230.1 |
| 8,000,313 B1* | 8/2011 | Shah | H04W 76/18 370/350 |
| 8,583,053 B1* | 11/2013 | Mahbod | H04L 1/188 455/421 |
| 2006/0059256 A1* | 3/2006 | Kakani | H04L 1/1671 709/224 |
| 2006/0195727 A1* | 8/2006 | Yoshitsugu | H04L 41/046 714/38.1 |
| 2007/0008884 A1* | 1/2007 | Tang | H04L 29/06 370/230 |

(Continued)

FOREIGN PATENT DOCUMENTS

JP 2006-005833 1/2006

Primary Examiner — Gregory Sefcheck
Assistant Examiner — Majid Esmaeilian
(74) Attorney, Agent, or Firm — Fitzpatrick, Cella, Harper & Scinto (57) ABSTRACT For appropriate communication control to improve throughput in TCP communication, a communication apparatus comprises: a communication unit configured to establish a TCP connection with an external communication apparatus and communicate with the external communication apparatus; a reception unit configured to receive device information including first information for specifying a hardware configuration of the external communication apparatus or second information for specifying a software configuration of the external communication apparatus, if the communication unit establishes the TCP connection with the external communication apparatus; and a control unit configured to perform control to change a re-transmission timeout (RTO) timer value of the TCP connection based on the received device information.

8 Claims, 7 Drawing Sheets (56) References Cited

U.S. PATENT DOCUMENTS

| | | | |
|---|---|---|---|
| 2010/0103946 A1* | 4/2010 | Nomura | H04L 43/0852 370/412 |
| 2010/0175123 A1* | 7/2010 | Karino | H04L 29/12377 726/12 |
| 2011/0207485 A1* | 8/2011 | Dimou | H04W 36/0055 455/507 |
| 2014/0378127 A1* | 12/2014 | Garnett | H04W 52/247 455/426.1 |
| 2015/0142564 A1* | 5/2015 | Lissack | G06Q 30/0255 705/14.53 |
| 2015/0188986 A1 | 7/2015 | Okubo | H04L 67/06 |
| 2015/0288586 A1* | 10/2015 | McClellan | H04L 41/142 709/224 |

* cited by examiner

| HARDWARE | OS | ADDITION COEFFICIENT α |
|---|---|---|
| Unknown | Unknown | 0.0 |
| DeviceA | OSx1.0 | 1.0 |
| DeviceA2 | OSx2.0 | 0.7 |
| DeviceA3 | OSx2.0 | 0.5 |
| DeviceB | OSx2.0 | 1.5 |
| DeviceB2 | OSx2.0 | 1.0 |
| DeviceC | OSy4.0 | 3.0 |
| DeviceC | OSy5.0 | 2.0 |
| DeviceC | OSy6.0 | 1.5 |

FIG. 10

| NUMBER OF TCP CONNECTIONS | ATTENUATION COEFFICIENT β |
|---|---|
| 1 | 1.00 |
| 2 | 0.50 |
| 3 | 0.33 |
| 4 | 0.25 |
| 5 | 0.20 |
| 6 | 0.17 |
| 7 | 0.14 |
| 8 | 0.13 |
| 9 | 0.11 |
| 10 | 0.10 |

COMMUNICATION APPARATUS AND CONTROL METHOD OF COMMUNICATION APPARATUS

BACKGROUND OF THE INVENTION

Field of the Invention

The present invention relates to a technique of improving throughput in TCP communication.

Description of the Related Art

The Transmission Control Protocol (TCP) is widely known as a protocol for performing congestion control in Internet communication. TCP is described in documents such as RFC 793, RFC 1122, RFC 2581, and RFC 2582, and subjected to continuous research for improvements. TCP uses automatic repeat request (ARQ) for error control. In ARQ, the sender transmits a data packet to the receiver, and the receiver that has received the data packet transmits an acknowledgement (ACK) packet to the sender. If no ACK packet has been received in response to the data packet, the sender re-transmits the data packet. Moreover, the sender tries to transmit a plurality of packets within a fixed size at once, in order to increase throughput. Such control is called sliding window flow control. This control is designed to gradually increase throughput to avoid network congestion.

In recent years, an increasing number of mobile communication terminals have been provided with high-speed communication schemes. Meanwhile, power saving has been promoted, too. Despite the capability of high-speed communication, communication delay jitter or sudden delays tend to occur due to power saving. When a sudden delay occurs, the reception of the ACK packet is delayed, so that the sender re-transmits the data packet. Besides, having re-transmitted the data packet, the sender determines that the network is congested, and performs control to decrease throughput. This causes lower throughput. To deal with such a sudden delay in a wireless environment, for example, Japanese Patent Laid-Open No. 2006-5833 discloses a technique of determining whether or not a temporal variation occurs based on network characteristic information and controlling the value of a congestion control variable.

However, appropriate communication control cannot be performed merely by determining whether or not a temporal variation occurs based on network characteristic information as described in Japanese Patent Laid-Open No. 2006-5833. For example, the above-mentioned power saving characteristic information of the communication terminal or control information relating to the operating system (OS) of the communication terminal are unable to be utilized.

SUMMARY OF THE INVENTION

According to one aspect of the present invention, a communication apparatus comprises: a communication unit configured to establish a TCP connection with an external communication apparatus and communicate with the external communication apparatus; a reception unit configured to receive device information including first information for specifying a hardware configuration of the external communication apparatus or second information for specifying a software configuration of the external communication apparatus, if the communication unit establishes the TCP connection with the external communication apparatus; and a control unit configured to perform control to change a re-transmission timeout (RTO) timer value of the TCP connection based on the received device information.

The present invention performs appropriate communication control to improve throughput in TCP communication.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will be described in detail below, with reference to the accompanying drawings. Note that the following embodiments are merely illustrative, and should not limit the scope of the present invention.

First Embodiment

As a first embodiment of a communication apparatus according to the present invention, a server apparatus 101 for providing a web service is described as an example below.

Terms

The terms used in the following description of the embodiments are as follows.

TCP (Transmission Control Protocol): a protocol typically used in communication that requires reliability such as file transmission and reception.

HTTP (Hypertext Transfer Protocol): a protocol used for transmission and reception of various content between a web client apparatus and a web server apparatus (RFC 1945, RFC 2068, RFC 2616).

Socket: an expression for identifying and classifying a communication path in the TCP layer (indicating a combination of an IP address and a TCP port number).

TCP connection: one communication path in the TCP layer (indicating a combination of a receiver socket and a sender socket).

Receive window size: the size of a buffer area for reception in the TCP protocol (TCP can prevent buffer overflow by notifying the sender of the remaining receive window size).

Congestion window size: the size of a buffer area for transmission in the TCP protocol (TCP attempts to improve communication speed by gradually increasing the congestion window size. Meanwhile, since simply increasing the congestion window size leads to communication path congestion, a congestion avoidance algorithm for controlling such window size is needed. Examples of the congestion avoidance algorithm implemented in TCP include Tahoe and Reno).

RTO (Re-transmission Time-Out): if no ACK packet has been received from the receiver in TCP, re-transmitting the transmission packet on an assumption that the transmission packet has been lost on the network.

RTO timer: a timer for measuring the time until the determination that the transmission packet has been lost (in TCP, the RTO timer is typically calculated at "A+4D", where A is the index moving average of RTT (Round Trip Time), and D is the index moving average of the mean deviation of RTT. The term "4D" is expected to be able to respond to sudden delay changes).

IEEE 802.11: a wireless LAN-related standard developed by the Institute of Electrical and Electronics Engineers (IEEE).

<Apparatus Structure>

Figure 1:
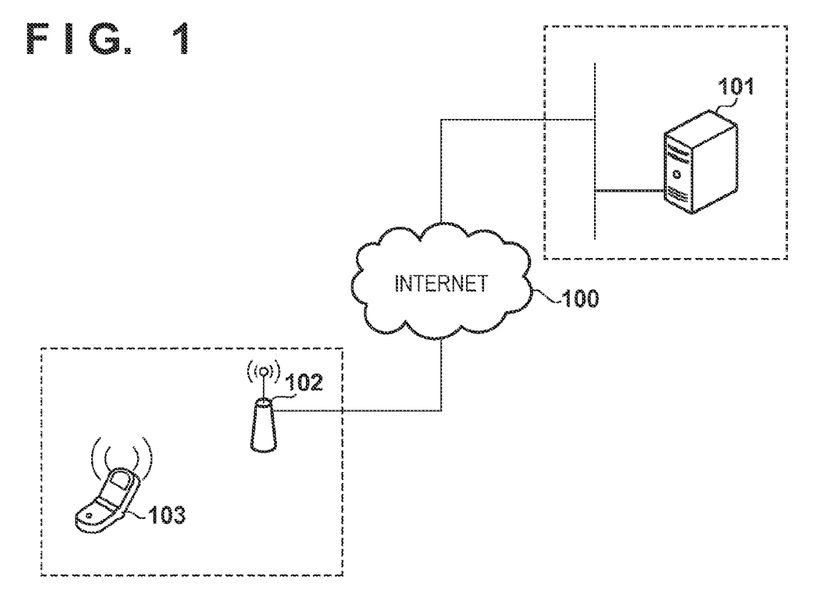
FIG. 1 is a diagram illustrating the structure of a communication system including a server apparatus which is a communication apparatus according to a first embodiment.

FIG. 1 is a diagram illustrating the structure of a communication system including a server apparatus 101 which is a communication apparatus according to the first embodiment.

The server apparatus 101 is a communication apparatus for providing a web service. In the web service, communication is typically performed using HTTP. Though the server apparatus 101 is a single server apparatus 101 in FIG. 1, the server apparatus 101 may be made up of a plurality of server apparatuses. The server apparatus 101 may also be configured as a virtual PC. A client apparatus 103 which is an external communication apparatus is a communication apparatus that accesses the server apparatus 101 via a wireless router 102 and uses the web service.

An internet 100 is a communication line network for transmitting and receiving information between the above-mentioned apparatuses over firewall. The internet 100 supports the TCP/IP protocol. The wireless router 102 is connected to the internet 100, and is capable of wireless communication with the client apparatus 103.

Figure 2:
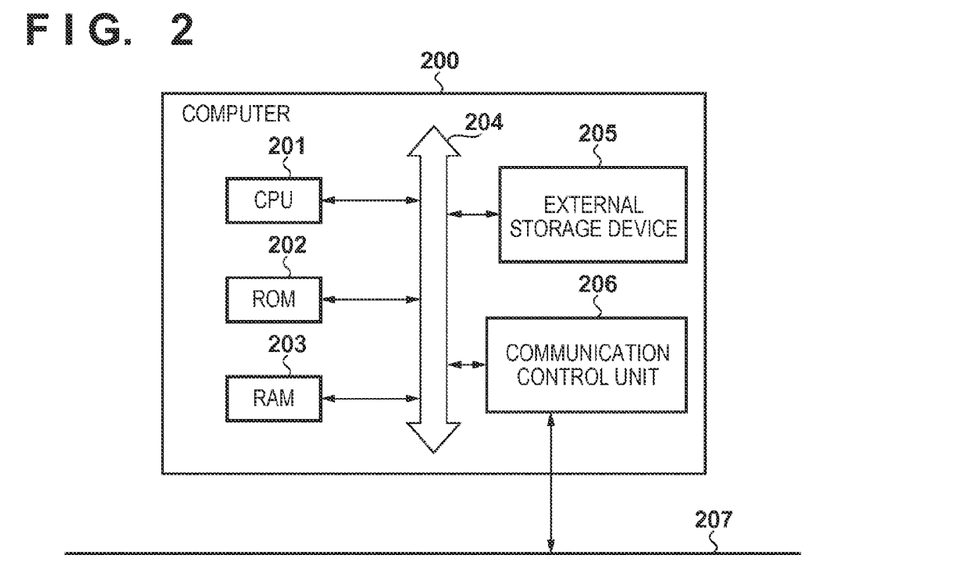
FIG. 2 is a diagram illustrating the hardware structure of the server apparatus and client apparatus.

FIG. 2 is a diagram illustrating the hardware structure of a computer 200 that constitutes the client apparatus 103 or the server apparatus 101.

The computer 200 includes a CPU 201 that executes an operating system or various application programs stored in a ROM 202 or an external storage device 205. The CPU 201 controls the devices connected to a system bus 204 in an integrated manner.

A RAM 203 functions as main memory, a work area, or the like of the CPU 201. A communication control unit 206 controls data transmission and reception with a LAN 207 via a network I/F 306.

Figure 3:
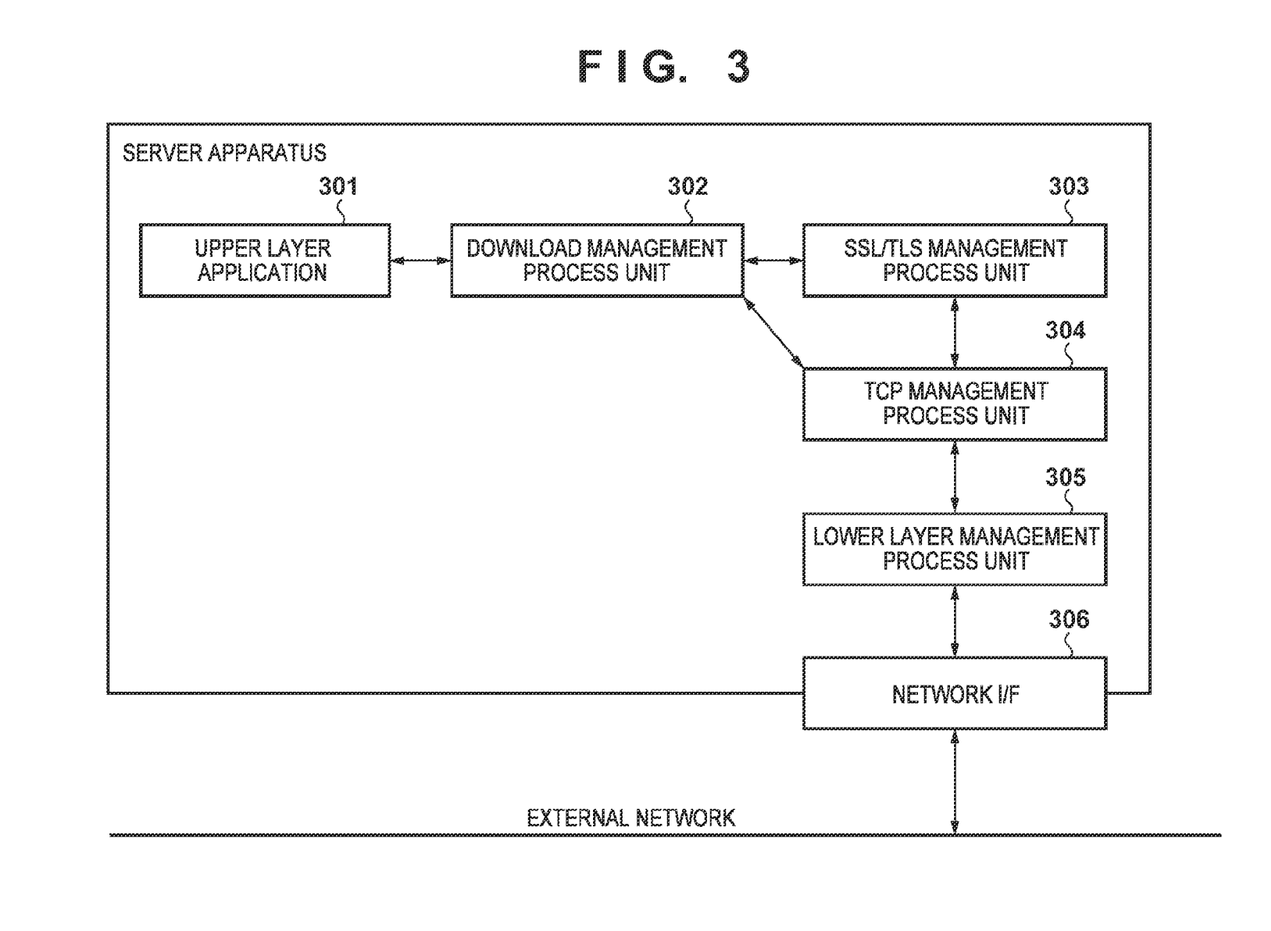
FIG. 3 is a diagram illustrating the software structure of the server apparatus.

FIG. 3 is a diagram illustrating the software structure of the server apparatus 101. The management mechanism up to the TCP layer may be implemented in any way as long as RFC 793 is satisfied and an available API is provided. In other words, implementation is not limited as long as the below-mentioned TCP management process unit 304 and lower layer management process unit 305 provide an appropriate API. Though the TCP management process unit 304 and the lower layer management process unit 305 are typically provided by the operating system in many cases, the below-mentioned management mechanism may be implemented separately.

A download management process unit 302 manages the transmission and reception process using HTTP communication, and provides an interface to an upper layer application 301. The download management process unit 302 also manages data transmission and reception in the lower layer. Though the download management process unit 302 is described in the form of one software library here, this function may be implemented in the operating system itself or in the hardware of the network I/F 306. Thus, any modification is possible as long as the same function and interface can be provided to the upper layer application 301.

The TCP management process unit 304 manages TCP connections. In detail, the TCP management process unit 304 manages TCP connection establishment, acceptance, transmission and reception, etc., and notifies the upper layer application 301 of the result. The TCP management process unit 304 may not only directly notify the upper layer application 301 of the result, but also notify an intermediate layer such as an SSL/TLS management process unit 303 of the result. SSL/TLS is a technique typically used in web services to perform authentication, encryption, and tampering detection.

The network I/F 306 is an interface for communicating with an external network. The network I/F 306 may be a wireless communication interface. In detail, the network I/F 306 may include a wireless antenna and a device for controlling the wireless antenna.

<Apparatus Operation>

The following considers a situation where the client apparatus 103 which is a mobile terminal requests an image processor (not illustrated) to perform printing, via the server apparatus 101. The server apparatus 101 provides a web service for converting an image received from the client apparatus 103 which is a mobile terminal into image data recognizable by the image processor. The following describes the case where HTTP is used as the communication protocol. However, other protocols having the same function or specific protocols may be used.

The operation of the server apparatus 101 is described in detail below, to illustrate the features of the present invention. Here, the server apparatus 101 meets the function of a typical HTTP server apparatus, and is capable of using a GET command and a HEAD command. The description of basic processes between the server apparatus and the client apparatus according to HTTP which are substantially not related to the present invention is omitted.

Figure 4:
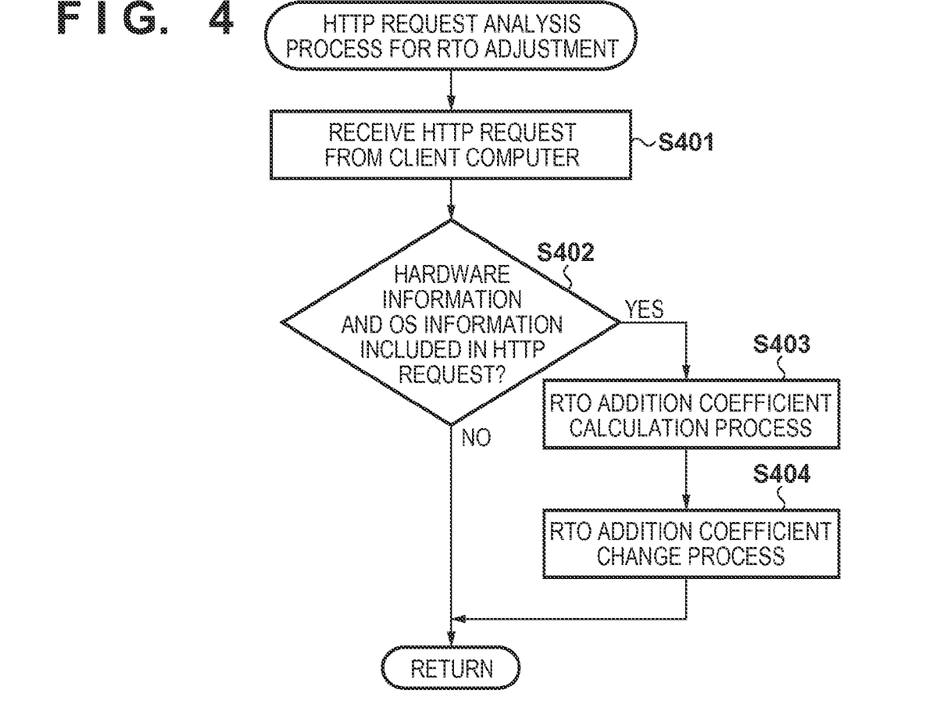
FIG. 4 is a flowchart of an HTTP request analysis process.

FIG. 4 is a flowchart of an HTTP request analysis process for RTO adjustment. The HTTP request analysis process for RTO adjustment is a process when the server apparatus 101 receives an HTTP request from the client apparatus 103. The following describes the operation performed in the server apparatus.

In step S401, the download management process unit 302 receives an HTTP request from the client apparatus 103. In step S402, the download management process unit 302 determines whether or not hardware information and OS information of the client apparatus 103 are included in the HTTP header in the HTTP request.

In detail, the client apparatus 103 establishes a TCP connection to the server apparatus 101. Here, the client apparatus 103 includes "hardware information" and "OS information" in the header of the HTTP request, as device information of the client apparatus 103. Several headers in which the hardware information and the OS information can be written are available. In this example, the information is written in a typically used User-Agent header. Note that any header may be used as long as it is within the HTTP request. Moreover, the information to be written is not limited to hardware information or OS information. In other words, it may include network characteristic information such as information of wired/wireless distinction, connection scheme type, and link speed.

The "hardware information" is information for specifying the hardware configuration of the client apparatus 103, such as the vendor name and the product name. The "OS information" is information for specifying the software configuration of the client apparatus 103, such as the name and version information of the OS used by the client apparatus 103. Here, "hardware information" and "OS information" are separated because, even when models have the same hardware information, the TCP communication behavior differs when different OSs are used.

If the download management process unit 302 determines in step S402 that the hardware information and the OS information are not included in the received HTTP request, the download management process unit 302 ends the HTTP request analysis process for RTO adjustment. In this case, the download management process unit 302 subsequently performs a normal HTTP request process. Typically, the upper layer application 301 is notified of the HTTP request reception in the HTTP request process. The response-related process by the upper layer application 301 differs depending on the application, and so its description is omitted.

If the download management process unit 302 determines in step S402 that the hardware information and the OS information are included in the received HTTP request, the download management process unit 302 advances to an RTO addition coefficient calculation process (step S403).

In step S403, the download management process unit 302 determines an RTO addition value, by assuming the amount of sudden delay in a wireless environment from the hardware information and OS information included in the HTTP request. For example, the download management process unit 302 determines the RTO addition value based on an addition coefficient specified in an RTO addition coefficient table stored beforehand. Though the following describes the case where the determination is made using only the combination of hardware information and OS information, other information may be used as well.

Figure 9:
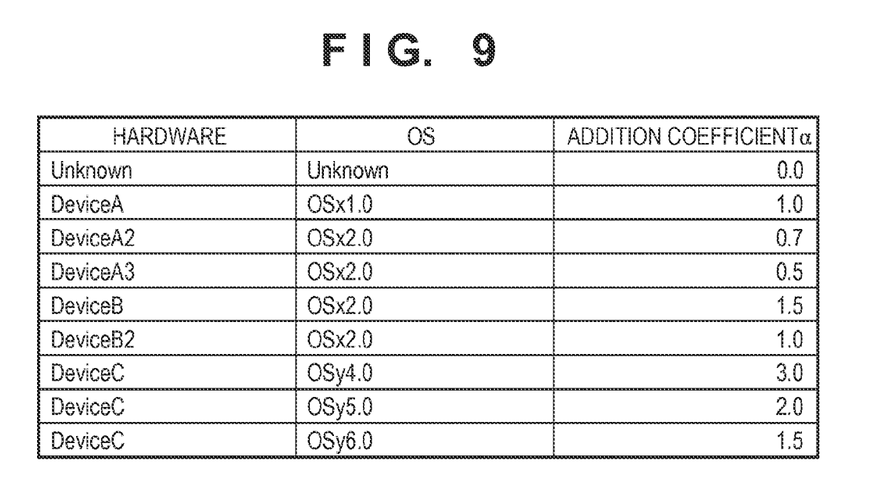
FIG. 9 is a diagram illustrating an example of an RTO addition coefficient table.

FIG. 9 is a diagram illustrating an example of the RTO addition coefficient table. In the RTO addition coefficient table, an addition coefficient α is set for each different combination of hardware information and OS information. The RTO addition coefficient is calculated with reference to the RTO addition coefficient table. Other calculation methods are also applicable as long as an RTO addition value appropriate for each client apparatus 103 is eventually obtained. For example, a dynamic method of measuring throughput according to the model or OS and calculating an RTO addition value based on the statistics may be used. Moreover, an RTO addition coefficient table in which the addition coefficient α is associated with only one of hardware information and OS information may be used.

Here, the download management process unit 302 calculates the RTO addition coefficient for the communication with the client apparatus 103, from the RTO addition coefficient table in FIG. 9. The RTO addition coefficient table is a hash table in which a unique RTO addition coefficient is designated for each combination of hardware information and OS information, as illustrated in FIG. 9. The RTO addition coefficient table may be statically configured, or be dynamically configurable by the server apparatus administrator later. The RTO addition coefficient may be calculated using only one of the hardware information and the OS information, instead of using both of the hardware information and the OS information.

In step S404, the download management process unit 302 sets the calculated RTO addition coefficient, as a parameter of the TCP connection linked to the HTTP session.

Figure 5:
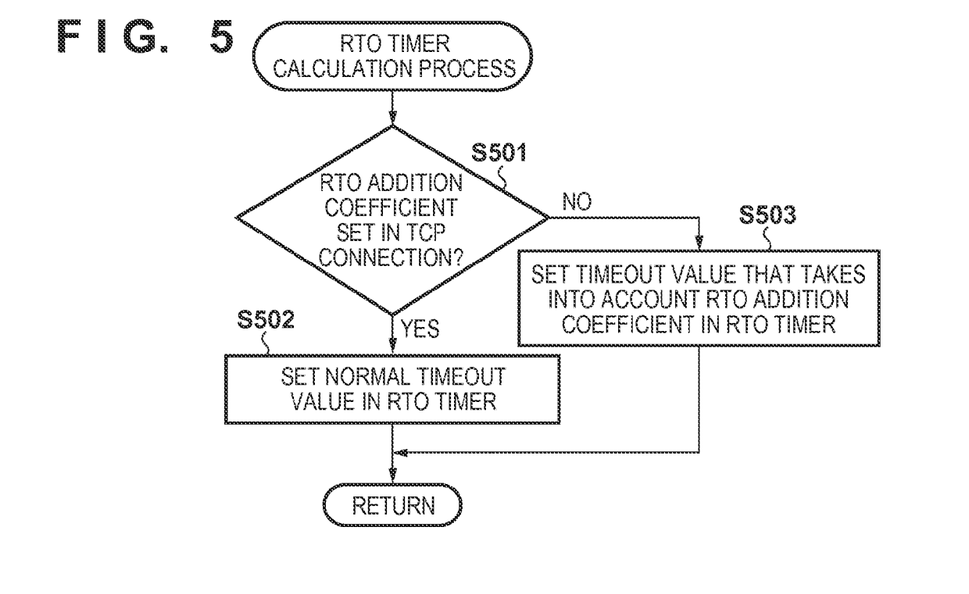
FIG. 5 is a flowchart of an RTO timer calculation process.

FIG. 5 is a flowchart of an RTO timer calculation process. The RTO timer calculation process is an RTO timer value setting process (change process) executed by the TCP management process unit 304. The following describes the operation performed in the server apparatus.

In step S501, the TCP management process unit 304 determines whether or not the RTO addition coefficient is set in the TCP connection. If the RTO addition coefficient is not set, the TCP management process unit 304 advances to step S502. If the RTO addition coefficient is set, the TCP management process unit 304 advances to step S503.

In step S502, the TCP management process unit 304 sets a normal timeout value in the RTO timer. In detail, the TCP management process unit 304 calculates a typical timeout value of the RTO timer of TCP. Though the actual calculation value may differ depending on the OS, "A+4D" is typically set.

In step S503, the TCP management process unit 304 calculates a timeout value that takes into account the RTO addition coefficient set by the download management process unit 302. In detail, the timeout value depends on the actual application, network, etc. For example, given that the typical RTO timer value calculation method is "A+4D", the timeout value may be calculated at "A+4D(1+a)", where a is the calculated RTO addition coefficient. Such calculation allows the RTO timer to be extended depending on the hardware information and OS information of the client apparatus 103.

The concrete calculation method is not limited to this. For example, whether or not a delay is likely to occur may be added to the determination, based on the connection scheme of the client apparatus 103. An example is a process of determining, if wired connection of the client apparatus 103 can be detected, that no sudden delay occurs, and performing no RTO timer addition.

After this, the TCP management process unit 304 ends the RTO timer calculation process. As a result of the process described above, the TCP management process unit 304 performs re-transmission control using the timeout value set in the RTO timer calculation process. In other words, the TCP management process unit 304 performs re-transmission control that takes into account the hardware information and OS information of the client apparatus 103 which is the communication partner. Concrete re-transmission control other than the RTO timer is the same as re-transmission control in typical TCP, and so its description is omitted.

Though the above describes the case where only the RTO timer is modified, another parameter having the same effect may be modified. For example, congestion avoidance control may be modified in the congestion avoidance algorithm. In detail, if a sudden delay is expected to occur based on the hardware information and the OS information, a modification such as extending the estimated delay time may be performed in the congestion avoidance algorithm.

As described above, according to the first embodiment, the RTO timer value is controlled by taking into account the hardware information and OS information of the communication partner. This enables re-transmission control that takes into account the hardware information and OS information of the communication partner, and improves throughput in TCP communication.

Second Embodiment

A second embodiment describes the form of transmitting hardware information and OS information using a TCP option. Thus, the second embodiment differs from the first embodiment in that the TCP option is used instead of the HTTP header. The structure of the communication system and the hardware structure are the same as those in the first embodiment, and so their description is omitted.

<Apparatus Operation>

Figure 6:
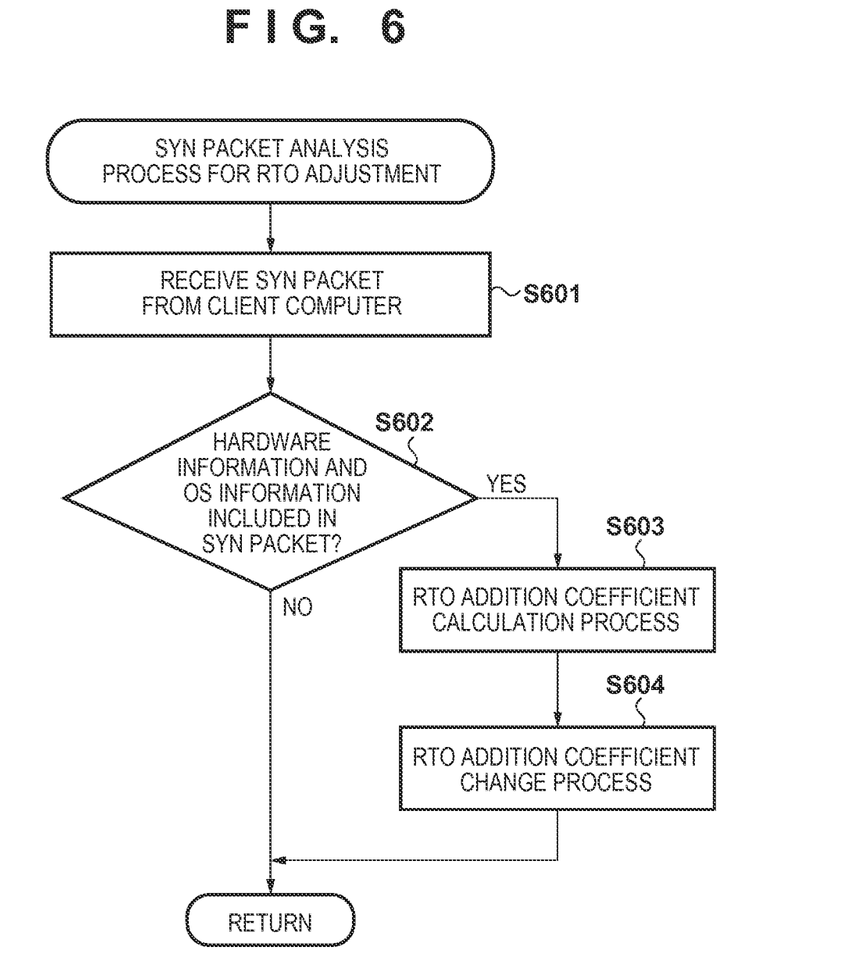
FIG. 6 is a flowchart of a SYN packet analysis process.

FIG. 6 is a flowchart of a SYN packet analysis process. The SYN packet analysis process is a process when the server apparatus 101 receives a SYN packet of TCP from the client apparatus 103. The following describes the operation performed in the server apparatus. The SYN packet is a packet that is transmitted when establishing a TCP connection and in which a SYN field in a control flag of the TCP header is set.

First, the client apparatus 103 includes (embeds) the hardware information and the OS information in an option area of the TCP header. Here, the option number needs to be determined in a range from 0 to 255. The client apparatus 103 selects a number not assigned by the Internet Assigned Numbers Authority (IRNA).

In step S601, the TCP management process unit 304 receives a SYN packet from the client apparatus 103. It is assumed here that IP layer-related information such as the source and destination IP addresses have already been analyzed at this point.

In step S602, the TCP management process unit 304 determines whether or not the hardware information and the OS information are included in the SYN packet. If the hardware information and the OS information are not included, the TCP management process unit 304 ends the SYN packet analysis process for RTO adjustment. If the hardware information and the OS information are included, the TCP management process unit 304 advances to step S603.

In step S603, the TCP management process unit 304 calculates an addition coefficient of the RTO timer. This process is the same as step S403. The difference from the first embodiment lies in that the process is executed not in the HTTP layer (the download management processing unit 302) but in the TCP layer (the TCP management processing unit 304).

In step S604, the TCP management process unit 304 sets the calculated RTO addition coefficient as a parameter of the TCP connection. The actual RTO timer calculation process is the same as that in the first embodiment (FIG. 5), and so its description is omitted.

As described above, according to the second embodiment, the RTO timer value is controlled by taking into account the hardware information and OS information of the communication partner as in the first embodiment. Moreover, by including the hardware information and the OS information in the option area of TCP, the RTO timer can be set in the TCP layer alone.

Third Embodiment

A third embodiment describes the form of using multi-HTTP session communication in which a plurality of HTTP sessions are used. Thus, the third embodiment differs from the first embodiment in that multiple HTTP sessions are used instead of a single HTTP session. The structure of the communication system and the hardware structure are the same as those in the first embodiment, and so their description is omitted.

Multi-HTTP session communication is a communication method of downloading single content simultaneously using a plurality of HTTP sessions. This method is widely used because improvements in throughput are expected regardless of the TCP implementation method by the OS. In detail, the client apparatus 103 downloads content in divided form, by using a Range header in an HTTP request. The range of the Range header is determined according to the number of HTTP sessions, with the download being shared among the HTTP sessions.

When performing wireless communication based on IEEE 802.11, the client apparatus 103 does not necessarily need to respond to signal transmission from the wireless router 102. This is called power saving mode, and intended to make it unnecessary to always supply power to the wireless transmission and reception device of the client apparatus 103. A sudden delay between the client apparatus 103 and the wireless router 102 is likely to be significantly related to this power saving mode. If the client apparatus 103 has no reception from the wireless router 102 for several hundred milliseconds, the client apparatus 103 enters the power saving mode, and requires several hundred milliseconds to resume from the power saving mode.

By employing multi-HTTP session communication, frequent packet transmission and reception with the server apparatus 101 can be performed without significantly depending on flow control of TCP. Frequent transmission and reception keep the client apparatus 103 from entering the power saving mode. Multi-HTTP session communication is thus expected to have an effect of improving throughput even in a mobile terminal subjected to power saving.

If a large RTO timer value is set, on the other hand, the detection of a real packet loss may be delayed. The RTO timer value accordingly needs to be as small as possible unless there is any special reason.

<Apparatus Operation>

Figure 7:
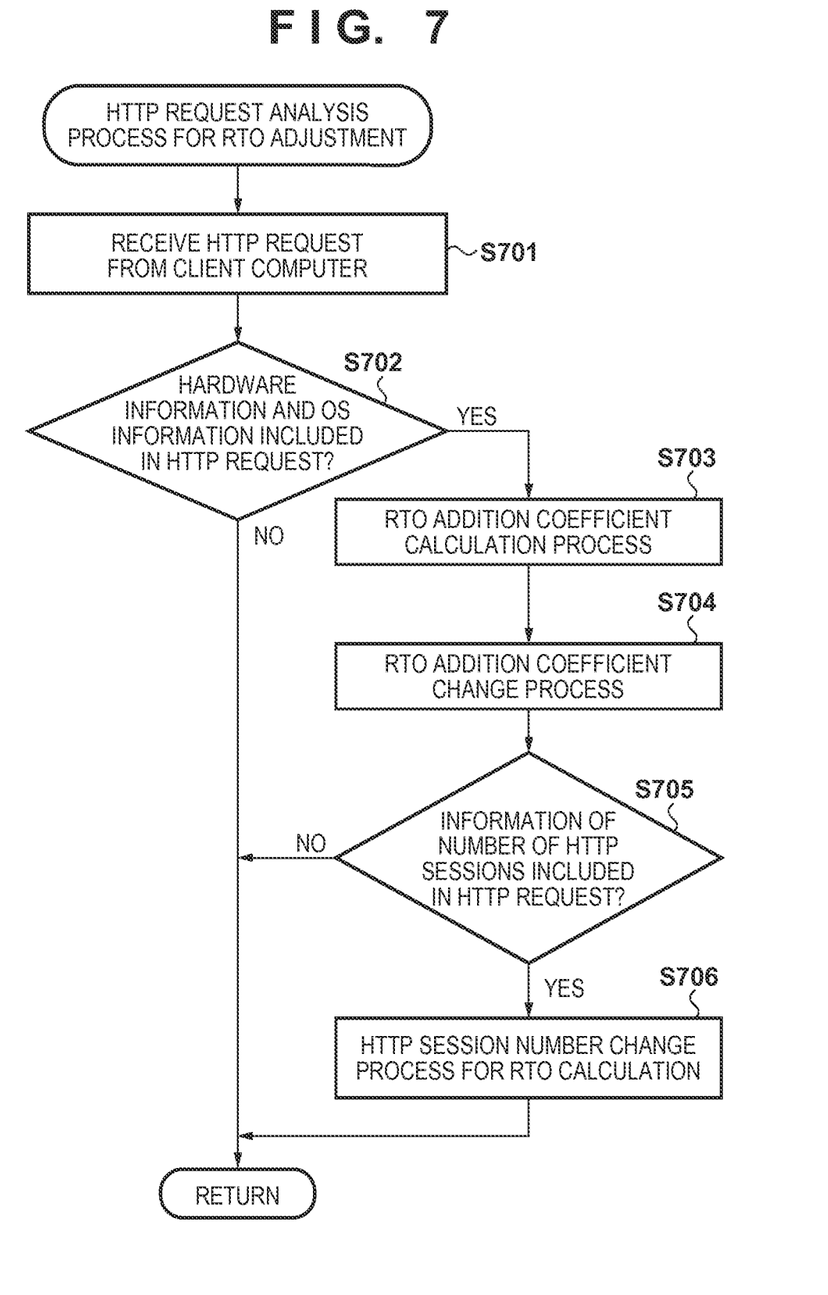
FIG. 7 is a flowchart of an HTTP request analysis process that takes into account the number of HTTP sessions.

FIG. 7 is a flowchart of an HTTP request analysis process that takes into account the number of HTTP sessions. The HTTP request analysis process is a process when the server apparatus 101 receives an HTTP request from the client apparatus 103. The following describes the operation performed in the server apparatus.

In step S701, the download management process unit 302 receives an HTTP request from the client apparatus 103. In step S702, the download management process unit 302 determines whether or not the hardware information and OS information of the client apparatus 103 are included in the HTTP header in the HTTP request.

If the download management process unit 302 determines in step S702 that the hardware information and the OS information are not included in the received HTTP request, the download management process unit 302 ends the HTTP request analysis process for RTO adjustment. In this case, the download management process unit 302 subsequently performs a normal HTTP request process.

If the download management process unit 302 determines in step S702 that the hardware information and the OS information are included in the received HTTP request, the download management process unit 302 advances to an RTO addition coefficient calculation process (step S703).

In step S703, the download management process unit 302 determines an RTO addition value, by assuming the amount of sudden delay in a wireless environment from the hardware information and OS information included in the HTTP request. In step S704, the download management process unit 302 sets the calculated RTO addition coefficient, as a parameter of the TCP connection linked to the HTTP session. Steps S703 and S704 are the same as those in the first embodiment (steps S403 and S404), and so their detailed description is omitted.

In step S705, the download management process unit 302 determines whether or not the number of HTTP sessions is included in the HTTP request. The number of HTTP sessions mentioned here is the number of HTTP sessions used in multi-HTTP session communication. The number of HTTP sessions is written in any part in the HTTP request. In this example, the information of the number of HTTP sessions is provided in the User-Agent header in the HTTP request. Alternatively, the information may be written in a specific header other than the User-Agent header, or written in the HTTP body portion. If multi-HTTP session communication is not performed, "1" is set as the number of HTTP sessions for convenience' sake.

If the information of the number of HTTP sessions is not included in the HTTP request, the download management process unit 302 ends the HTTP request analysis process for RTO adjustment. If the information of the number of HTTP sessions is included in the HTTP request, the download management process unit 302 advances to step S706.

In step S706, the download management process unit 302 sets the acquired number of HTTP sessions in the corresponding TCP connection as the number of HTTP sessions for RTO calculation. After the setting, the download management process unit 302 ends the HTTP request analysis process for RTO adjustment.

Figure 8:
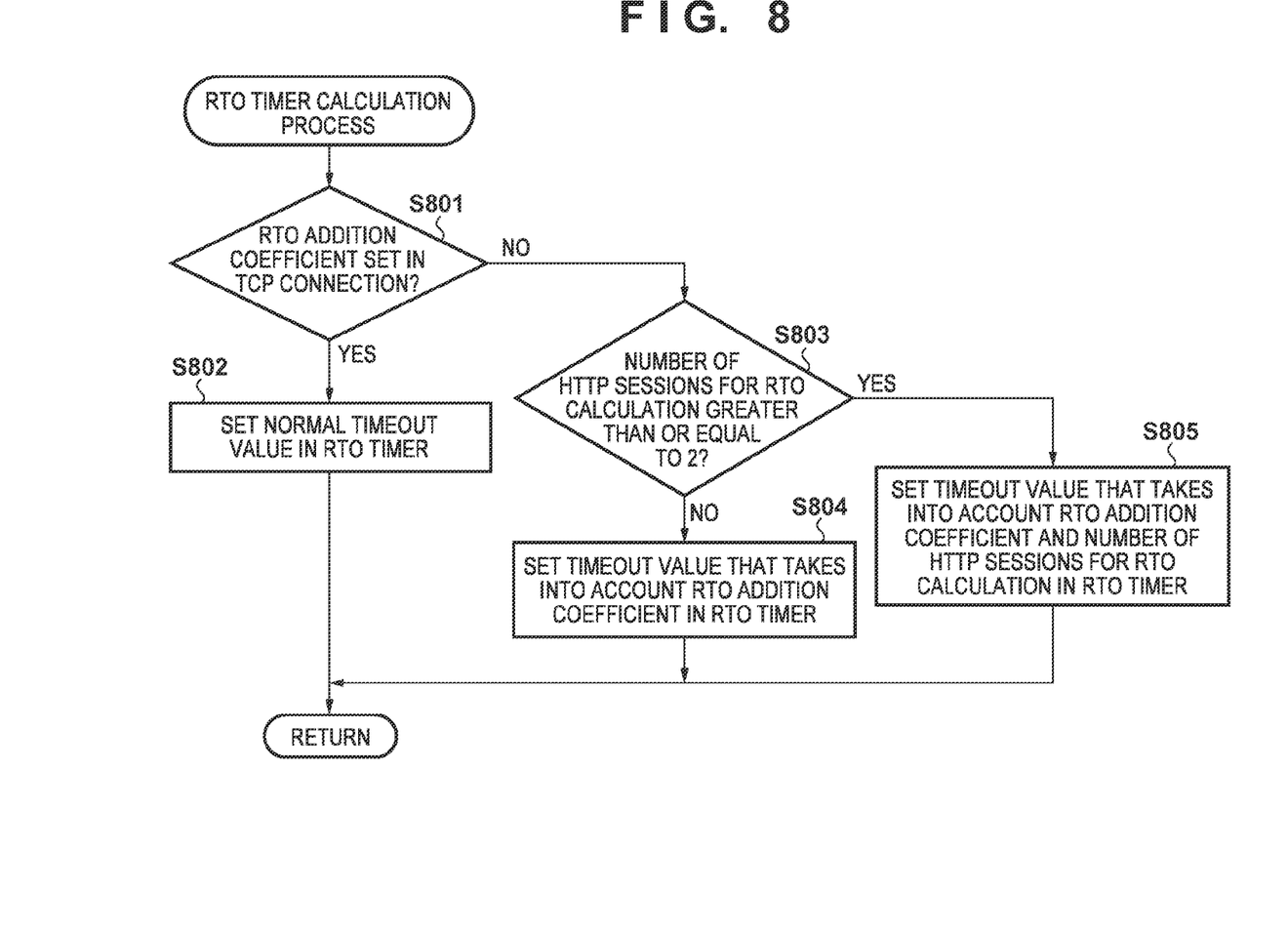
FIG. 8 is a flowchart of an RTO timer calculation process that takes into account the number of HTTP sessions.

FIG. 8 is a flowchart of an RTO timer calculation process that takes into account the number of HTTP sessions. The RTO timer calculation process is an RTO timer setting process executed by the TCP management process unit 304. The following describes the operation performed in the server apparatus.

In step S801, the TCP management process unit 304 determines whether or not the RTO addition coefficient is set in the TCP connection. If the RTO addition coefficient is not set, the TCP management process unit 304 advances to step S802. If the RTO addition coefficient is set, the TCP management process unit 304 advances to step S803.

In step S802, the TCP management process unit 304 sets a normal timeout value in the RTO timer. The TCP management process unit 304 then ends the RTO timer calculation process. The normal timeout value calculation method is the same as that in the first embodiment (step S502), and so its description is omitted.

In step S803, the TCP management process unit 304 determines whether or not the number of HTTP sessions for RTO calculation is greater than or equal to 2, that is, whether or not the communication is multi-HTTP session communication. If the communication is not multi-HTTP session communication, the TCP management process unit 304 advances to step S804. If the communication is multi-HTTP session communication, the TCP management process unit 304 advances to step S805.

In step S804, the TCP management process unit 304 calculates a timeout value that takes into account the RTO addition coefficient set by the download management process unit 302. The detailed calculation method is the same as that in the first embodiment (step S503), and so its description is omitted.

In step S805, the TCP management process unit 304 calculates a timeout value that takes into account the RTO addition coefficient and the number of HTTP sessions for RTO calculation. The calculation of "A+4D(1+α)" is shown in the foregoing first embodiment. In this embodiment, the timeout value is further controlled according to the number of multiple HTTP sessions. This is based on an assumption that, when the number of sessions is larger, the client apparatus 103 is less likely to enter the power saving mode for achieving the power saving function and the addition of the timeout value of the RTO timer is not necessary.

Figure 10:
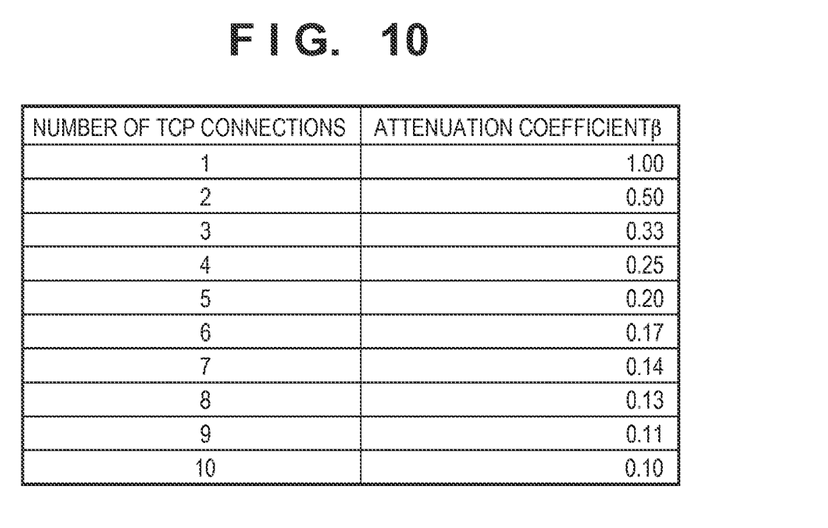
FIG. 10 is a diagram illustrating an example of an attenuation coefficient table according to the number of HTTP sessions.

FIG. 10 is a diagram illustrating an example of an attenuation coefficient table according to the number of HTTP sessions. An attenuation coefficient β is determined from the number of HTTP sessions for RTO calculation, with reference to the table in FIG. 10. In step S805, the TCP management process unit 304 sets a timeout value such as "A+4D(1+αβ)". In this way, the addition of the timeout value of the RTO timer can be gradually reduced as the number of sessions increases. Though the attenuation coefficient β is determined with reference to the table in this example, any calculation method may be used as long as the eventual timeout value of the RTO timer is closer to the normal state when the number of multiple HTTP sessions is larger.

As described above, according to the third embodiment, the RTO timer value is controlled by taking into account the hardware information and OS information of the communication partner as in the first embodiment. Moreover, unnecessary RTO timer extension can be prevented by taking into account the number of multiple HTTP sessions as well.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-140867, filed Jul. 8, 2014, which is hereby incorporated by reference herein in its entirety.

What is claimed is:

1. A communication apparatus comprising:
a communication unit configured to establish a TCP connection with an external communication apparatus and communicate with the external communication apparatus;
a reception unit configured to receive device information, if the communication unit establishes the TCP connection with the external communication apparatus; and
a control unit configured to perform control to determine a re-transmission timeout (RTO) timer value of the TCP connection based on (i) a Round Trip Time (RTT), (ii) at least one of first information and second information included in the received device information, and (iii) the number of HTTP sessions, wherein the first information is information for specifying a hardware configuration of the external communication apparatus and the second information is information for specifying a software configuration of the external communication apparatus,
wherein the control unit increases the RTO timer value based on the at least one of the first information and the second information, and decreases the RTO timer value based on the number of HTTP sessions.

2. The communication apparatus according to claim 1, wherein the device information is included in an HTTP request transmitted via the TCP connection.

3. The communication apparatus according to claim 2, wherein information of the number of HTTP sessions is also included in the HTTP request.

4. The communication apparatus according to claim 1, wherein the device information is included in a SYN packet transmitted via the TCP connection.

5. The communication apparatus according to claim 1, further comprising
a storage unit configured to store an addition coefficient table associated with at least one of the hardware configuration and the software configuration,
wherein the control unit is configured to determine the RTO timer value of the TCP connection, based on the addition coefficient table and at least one of the first information and the second information.

6. A control method of a communication apparatus that establishes a TCP connection with an external communication apparatus and communicates with the external communication apparatus, the control method comprising:
receiving device information, if the communication apparatus establishes the TCP connection with the external communication apparatus;
performing control to determine a re-transmission timeout (RTO) timer value of the TCP connection based on (i) a Round Trip Time (RTT), (ii) at least one of first information and second information included in the received device information, and (iii) the number of HTTP sessions, wherein the first information is information for specifying a hardware configuration of the external communication apparatus and the second information is information for specifying a software configuration of the external communication apparatus; and
executing communication via the TCP connection, based on the changed RTO timer value,
wherein, in performing control, the RTO timer value is increased based on the at least one of the first information and the second information, and is decreased based on the number of HTTP sessions.

7. A communication system comprising a first communication apparatus and a second communication apparatus,
wherein the first communication apparatus includes:
a first communication unit configured to establish a TCP connection with the second communication apparatus and communicate with the second communication apparatus; and
a transmission unit configured to transmit, to the second communication apparatus, device information including first information for specifying a hardware configuration of the first communication apparatus or second information for specifying a software configuration of the first communication apparatus, if the first communication unit establishes the TCP connection with the second communication apparatus, and
wherein the second communication apparatus includes:
a second communication unit configured to establish the TCP connection with the first communication apparatus and communicate with the first communication apparatus;
a reception unit configured to receive the device information from the first communication apparatus, if the second communication unit establishes the TCP connection with the first communication apparatus; and
a control unit configured to perform control to determine a re-transmission timeout (RTO) timer value of the TCP connection based on (i) a Round Trip Time (RTT), (ii) at least one of the first information and the second information included in the received device information, and (iii) the number of HTTP sessions,
wherein the control unit increases the RTO timer value based on the at least one of the first information and the second information, and decreases the RTO timer value based on the number of HTTP sessions.

8. The communication system according to claim 7, wherein the first communication unit has a power saving function.

* * * * *